Patented June 11, 1929.

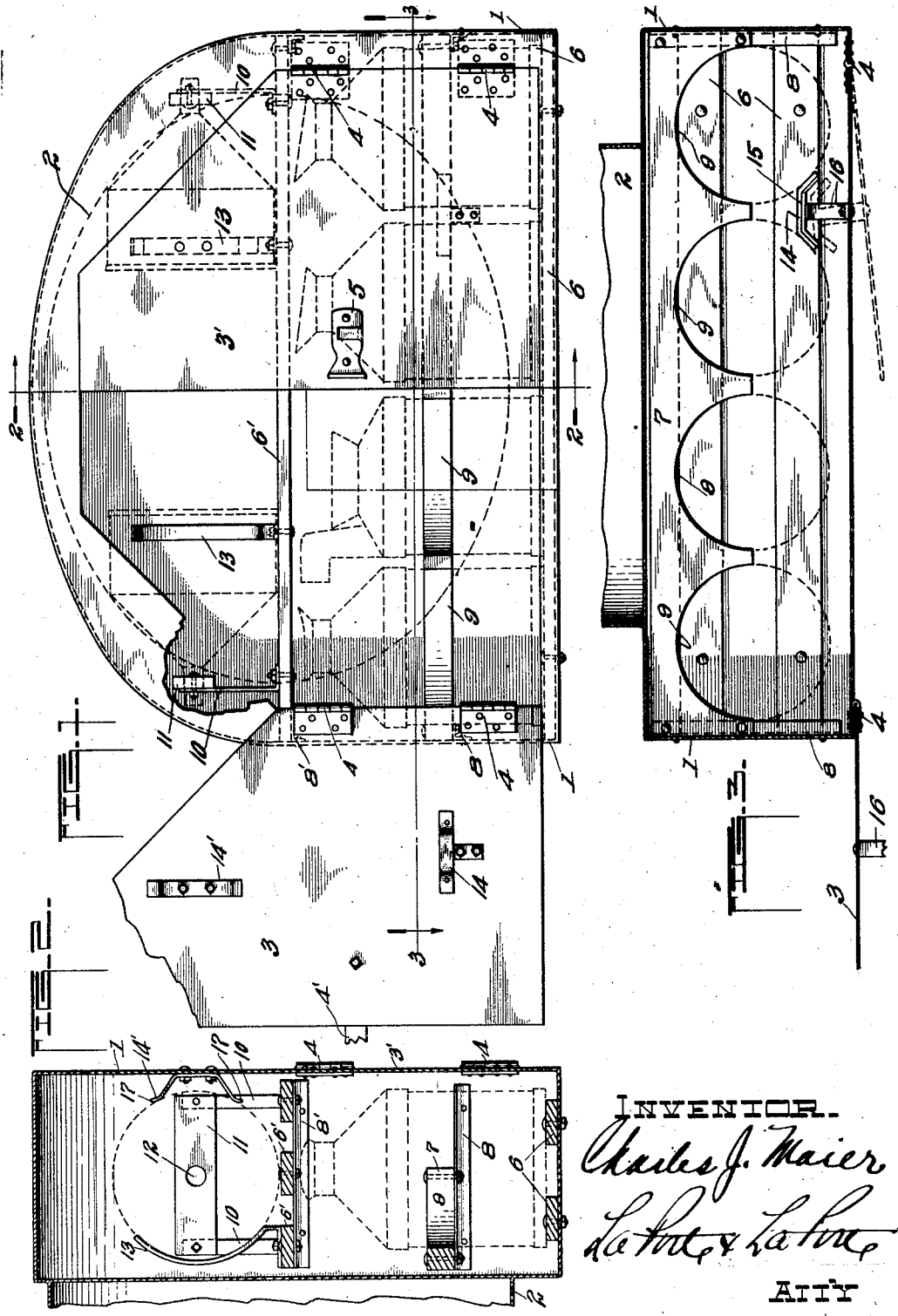

1,716,703

UNITED STATES PATENT OFFICE.

CHARLES J. MAIER, OF DECATUR, ILLINOIS, ASSIGNOR TO LEADER IRON WORKS, OF DECATUR, ILLINOIS, A CORPORATION OF ILLINOIS.

STORAGE COMPARTMENT.

Application filed May 24, 1926. Serial No. 111,252.

This invention has reference to certain new and useful improvements in storage compartments, especially adaptable for use in connection with truck tanks and other liquid carrying vehicles.

The principal object of the invention is the provision of a storage compartment, wherein receptacles, such as buckets, pails, funnels, etc., may be effectively held against movement in individual compartments or individual receiving means provided therefor, in a manner to prevent such receptacles from jostling, bumping and damaging each other, especially in use with a truck tank or other liquid carrying vehicle.

The invention has for a further object to provide a storage compartment comprising an upper and a lower compartment adapted for individual placement of receptacles, such as, buckets, pails, funnels, etc., which receptacles are automatically held or retained firmly in place upon closing or shutting the door or doors of the storage compartment, by means of receptacle engaging means provided on the door or doors of the storage compartment.

That the invention may be more fully understood, reference is had to the accompanying drawings, illustrating a preferred embodiment of the invention, in which:—

Figure 1 is an end view in elevation of my improved storage compartment, the receptacles being shown in dotted lines and one of the doors of the storage compartment left open showing the receptacle engaging means;

Figure 2 is a cross section in elevation, as the same would appear, if taken on the line 2—2, Fig. 1, and Figure 3 is a longitudinal sectional view as the same would appear if taken on the line 3—3, Fig. 1.

Like characters of reference denote corresponding parts throughout the figures.

Reference being had to Figures 2 and 3 of the drawing, 1 designates a storage chamber or compartment, preferably rectangular in cross section, the same being formed or attached adjacently in any preferred manner to a cylindrical tank or casing 2, wherein fuel oil, gasoline or other liquids are encased, the tank or casing being shown in dotted lines in Figure 1.

Storage chambers or compartments, it is acknowledged, have come into general use in connection with truck tank and fuel carrying vehicles, for the purpose of providing a compartment or chamber for the placement and storage of receptacles such as buckets, pails, funnels and other articles that are used in the sale and distribution of the liquids aforementioned. The practice, however, of merely providing a chamber or compartment for the promiscuous storage of the receptacles above mentioned, does not prevent the receptacles from jostling, pumping and damaging each other when within the compartment or chamber, especially during the movement of the vehicle. Receptacle equipment, such as buckets, cans, funnels, etc., must be necessarily complete when used in connection with a truck tank for the sale and distribution of fuel products, and without means provided in the storage chamber or compartment to prevent such equipment from jostling around and damaging itself therein, it can be readily seen that great damage to the equipment will result therefrom, rendering it in time useless, and to remedy this condition the present invention has been devised.

The walls of the storage chamber or compartment 1 may be of any suitable material; however, for service and long wear a metal construction is most desirable. Entrance within the storage chamber or compartment 1 is made by the preferably metal doors 3 and 3', the same being pivotally mounted and capable of swinging movement by means of the hinges 4 secured to the end walls of said storage compartment 1, best seen in Figure 1. The doors are provided with locking or latching means composed of the lever arm 4 and catch 5.

Referring to Figures 2 and 3, base or supporting rails 6 for the receptacles are provided on the bottom of the compartment or chamber 1 therewithin and are preferably adapted to extend longitudinally thereof, said boards being fastened or secured to the bottom wall of the chamber or compartment by any suitable means; however, I have preferred to show the boards as being bolted.

Suitably elevated above the base boards 6 and disposed longitudinally of the chamber or compartment 1 is provided a receptacle adaptor or spacing member 7 which obtains its support at its opposite ends by means of preferably angle iron supports 8 attached in any suitable manner to the ends walls of the storage chamber or compartment 1, see Figures 1, 2 and 3. The member 7, see Figure 3, is formed or provided with a plurality of receptacle receiving openings 9 throughout its length, into which, when a corresponding number of receptacles, such as, buckets, cans and pails, are placed within the chamber or compartment 1 and upon the base or support boards 6, will snugly fit into and conform to the openings 9 of the member 7, as shown in the dotted line positions in Figures 1, 2 and 3, as, it is believed, will be readily understood. For purposes of illustration, the openings 9 of the member 7 are shown to be circular to conform to and receive a circularly shaped vessel or receptacle; however, it is to be understood that the openings 9 may be of smaller or larger diameter and be configured to conform or adapt themselves to different shaped vessels or receptacles, as the case may require.

For the storage and placement of funnels within the compartment or chamber 1, a platform extending longitudinally of the chamber is provided, and positioned slightly above the normal height of the vessels or receptacles stored therebelow. The platform comprises two or more base or supporting rails 6' which extend longitudinally of the compartment and are secured in any suitable manner at their opposite ends, preferably by means of angle iron supports 8' which are connected to the end walls of the chamber or compartment in a like manner as the supports 8. Located preferably near the opposite ends of the funnel platform is provided a funnel rack comprising a pair of upstanding brace arms 10, which are connected at their upper ends by a horizontally disposed strip or board member 11 having a hole 12 bored therethrough, preferably centrally thereof. Spaced inwardly a suitable distance from the opposite ends of the base or support board 6', see Figure 2, is provided a spring member 13, the body of which is shaped in the form of an arc to conform to the circular surface of a funnel, the base of which member 13 is suitably attached or secured to the rail 6', next adjacent the rear wall of the storage compartment or chamber, by means of a bolt or other suitable means, see Figure 2. For the storage and placement of funnels within the chamber or compartment 1, it will be readily understood that the spout of the funnel is inserted into the hole 12 of the horizontally disposed member 11, while the body of the funnel is engaged by the circularly shaped spring member 13, the funnel or funnels taking the dotted line position, as shown in Figure 1.

The containers or receptacles, such as buckets, cans, pails and other like vessels having been inserted into the lower compartment and inserted into the respective openings 9 of the member 7, and the funnels inserted into the fittings provided therefor in the upper compartment, as shown in Figures 1 and 3, to prevent the receptacles from jarring about and moving from their respective places and becoming damaged thereby, especially during the movement and travel of the vehicle or truck to which the storage chamber or compartment 1 may be attached, there is provided upon the inside face of the doors 3 and 3' a plurality of receptacle engaging and retention members 14 and 14'. When the doors 3 and 3' are closed, said members 14 are caused to be brought into engagement with the receptacles in the lower compartment or chamber, in the manner shown in Figure 3, and the members 14' are caused to contact with the funnels in the upper compartment or chamber, in the manner shown in Figure 2. The members 14 are formed or shaped in such a manner and so positioned upon the doors 3 and 3' that upon the same being closed, the receptacle engaging surfaces 15 of the members 14 are brought against the sides of the bodies of preferably two receptacles, as shown in Figure 3, and upon the door or doors being completely shut, said members 14 are permitted a slight spring action by means of the arms 16 which are connected in any suitable manner to the door, thereby insuring complete engagement with the receptacles and preventing movement therebetween. The members 14' are likewise formed and positioned upon the doors 3 and 3' and upon being closed, the spring ends 17 of the members 14' engage and adapt themselves to the circumference of the body of the funnels, thereby preventing the funnel from becoming loose or rattling in position and becoming damaged.

While I have shown and described preferred embodiments of my invention, it will be obvious that various changes in minor mechanical details may be resorted to without departing from the spirit and scope of the invention or sacrificing any of the material advantages thereof.

What I claim is:

1. In a storage receptacle, a housing having a horizontal supporting portion to engage the bottoms of a pair of receptacles, a pair of spaced seats disposed rearwardly of the front of the housing and spaced above said supporting portion and formed to receive the rear portions of the pair of receptacles therein, a closure for the housing, and a yieldable element carried by the closure composed of a substantially T-shaped yieldable member secured at the lower end of its stem to the closure at a point in alinement with the space between said seats and having its head free and having the free ends of said head shaped to engage adjacent front portions of each of the pair of receptacles so as to hold each of the latter in its seat.

2. In a storage receptacle, a housing having a horizontal supporting portion to engage the bottom of a pair of receptacles, a pair of spaced seats disposed rearwardly of the front of the housing and above said supporting portion and formed to receive the rear portions of the pair of receptacles therein, a closure for the housing, and a yieldable element carried by the closure at a point alined with the space between said seats and having a portion formed to engage the front sides of each of said receptacles so as to hold each of the latter in its seat.

In witness whereof, I have hereunto affixed my hand this 21st day of May, 1926.

CHARLES J. MAIER.